United States Patent
Meguriya et al.

(10) Patent No.: US 7,166,363 B2
(45) Date of Patent: Jan. 23, 2007

(54) HIGHLY HEAT CONDUCTIVE SILICONE RUBBER COMPOSITION, FIXING ROLL AND FIXING BELT

(75) Inventors: Noriyuki Meguriya, Gunma-ken (JP); Satao Hirabayashi, Gunma-ken (JP); Shigeru Ubukata, Gunma-ken (JP); Nobumasa Tomizawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 172 days.

(21) Appl. No.: 10/923,703

(22) Filed: Aug. 24, 2004

(65) Prior Publication Data

US 2005/0048296 A1 Mar. 3, 2005

(30) Foreign Application Priority Data

Aug. 25, 2003 (JP) ............... 2003-299799

(51) Int. Cl.
*B32B 25/20* (2006.01)
(52) U.S. Cl. .................. 428/447; 528/32; 528/31; 524/588
(58) Field of Classification Search .............. 528/32, 528/31; 524/588; 428/447
See application file for complete search history.

(56) References Cited

U.S. PATENT DOCUMENTS

| | | | |
|---|---|---|---|
| 4,444,944 A | 4/1984 | Matsushita | |
| 5,008,307 A | 4/1991 | Inomata | |
| 5,206,329 A * | 4/1993 | Sumpter et al. | ............ 528/15 |
| 6,569,536 B1 | 5/2003 | Oka et al. | |
| 6,761,673 B1 * | 7/2004 | Shudo | ............ 492/56 |
| 6,940,177 B1 * | 9/2005 | Dent et al. | ............ 257/779 |

FOREIGN PATENT DOCUMENTS

| | | |
|---|---|---|
| JP | 58-219259 A | 12/1983 |
| JP | 63-251466 A | 10/1988 |
| JP | 3-221982 A | 9/1991 |
| JP | 10-39666 A | 2/1998 |
| JP | 11-116806 A | 4/1999 |
| JP | 2002-72728 A | 3/2002 |

* cited by examiner

*Primary Examiner*—Kuo-Liang Peng
(74) *Attorney, Agent, or Firm*—Birch, Stewart, Kolasch, and Birch, LLP

(57) ABSTRACT

A silicone rubber composition comprising (A) a normally liquid organopolysiloxane having at least two silicon atom-bonded alkenyl radicals, (B) a liquid organohydrogenpolysiloxane having at least two Si—H radicals, (C) a blend of two inorganic powders selected from three highly heat conductive inorganic powders which form 30% slurries at pH at least 8, 6 to less than 8, and less than 6, and (D) an addition reaction catalyst cures into a silicone rubber having a high thermal conductivity and heat resistance and is suited for fixing rolls or belts in copiers.

15 Claims, No Drawings

HIGHLY HEAT CONDUCTIVE SILICONE RUBBER COMPOSITION, FIXING ROLL AND FIXING BELT

CROSS-REFERENCE TO RELATED APPLICATION

This non-provisional application claims priority under 35 U.S.C. Section 119(a) on Patent Application No. 2003-299799 filed in Japan on Aug. 25, 2003, the entire contents of which are hereby incorporated by reference.

TECHNICAL FIELD

This invention relates to a highly heat conductive silicone rubber composition and a fixing roll or belt using the same. More particularly, it relates to a highly heat conductive silicone rubber composition of the addition cure type capable of forming silicone rubber which has a high thermal conductivity and undergoes little changes of physical properties upon exposure to elevated temperature, and a fixing roll or belt using the same.

BACKGROUND ART

Silicone rubber is valued for electrical insulation, heat resistance, weather resistance and flame retardance and used, for example, as coatings on fixing rolls like heating rolls and pressure rolls in copiers and laser printers. To comply with higher speed copiers and color copiers which are recently on wide-spreading use, fixing rolls are required to have lower hardness. Prior art metal materials and fluororesins fail to meet such requirements, and rolls of the type in which fluororesin is coated over heat conductive silicone rubber are often employed. In particular, the rubber used in heating rolls is required to have a high thermal conductivity from the standpoints of reducing the waiting time upon startup of the machine and saving the energy consumed by the machine itself. A low compression set is also required because the rubber is always exposed to high temperatures of 150 to 200° C. However, since silicone rubber itself is not so heat conductive, fillers having a high thermal conductivity are generally added. Such filled silicone rubber compositions are disclosed, for example, in JP-A 58-219259 corresponding to U.S. Pat. No. 4,444,944, JP-A 3-221982 and JP-A 10-39666. In these compositions, silica, alumina, magnesium oxide and the like are added to common silicone rubbers as the heat conductive filler. These fillers, however, have the problem that when heavily loaded, they are detrimental to silicone rubber at elevated temperature. JP-A 63-251466 corresponding to U.S. Pat. No. 5,008,307 describes that alumina having alkali and acid levels of up to 5 ppm is recommended for electronic part application, but does not refer to the pH of alumina itself. When alumina is removed of alkali and acid components as by washing, the resulting filler becomes expensive. This patent refers nowhere to the application to rolls and belts. JP-A 11-116806 describes that the use of alumina containing a reduced sodium level of up to 50 ppm contributes to improved heat resistance. No reference is made to the pH of alumina itself nor the use of fillers having different pH. JP-A 2002-72728 corresponding to U.S. Pat. No. 6,569,536 discloses the use of alumina having a reduced heat loss although this does not achieve satisfactory results.

SUMMARY OF THE INVENTION

An object of the invention is to provide a silicone rubber composition which has so high a thermal conductivity and heat resistance that it is suited as coatings on fixing rolls and fixing belts. Another object is to provide a fixing roll and belt using the same.

In the course of the inventor's investigation, highly heat conductive inorganic powders are divided into three groups: alkaline powder (pH 8 or higher), neutral powder (pH 6 to less than 8), and acidic powder (below pH 6). The inventor has discovered that a blend of two inorganic powders selected from these three groups, preferably a blend of two selected organic powders having different particle sizes, avoids agglomeration of an alkaline or acid inorganic powder alone and is incorporated in a silicone rubber composition, which becomes suitable as coatings on fixing rolls and belts due to high thermal conductivity and heat resistance.

In one aspect, the invention provides a highly heat conductive silicone rubber composition for fixing rolls or belts, comprising
(A) 100 parts by weight of an organopolysiloxane having at least two silicon atom-bonded alkenyl radicals in a molecule which is liquid at room temperature,
(B) 0.1 to 30 parts by weight of a liquid organohydrogenpolysiloxane having at least two silicon atom-bonded hydrogen atoms in a molecule which has a viscosity of up to. 1,000 mPa·s at 25° C.,
(C) 100 to 1,000 parts by weight of a highly heat conductive inorganic powder comprising a blend of two inorganic powders selected from (C-1) to (C-3) in a weight ratio between 1/9 and 9/1,
 (C-1) a highly heat conductive inorganic powder which forms a 30% slurry having a pH value of at least 8,
 (C-2) a highly heat conductive inorganic powder which forms a 30% slurry having a pH value of 6 to less than 8, and
 (C-3) a highly heat conductive inorganic powder which forms a 30% slurry having a pH value of less than 6, and
(D) a catalytic amount of an addition reaction catalyst.

In a preferred embodiment, the highly heat conductive powder (C) has an average particle size in the range of 0.5 to 30 μm, and the ratio in average particle size of two inorganic powders, [(C-1)/(C-2)], [(C-1)/(C-3)] or [(C-2)/(C-3)] is up to 0.5 or at least 2.

In a preferred embodiment, the highly heat conductive powders are selected from among ground quartz, alumina, zinc oxide, magnesium oxide and silicon carbide.

In a preferred embodiment, component (C) is a blend of the highly heat conductive powder (C-1) comprising alumina and the highly heat conductive powder (C-2) comprising ground quartz; or a blend of the highly heat conductive powder (C-1) comprising alumina and the highly heat conductive powder (C-3) comprising alumina.

Preferably the highly heat conductive silicone rubber composition in the cured state has a thermal conductivity of at least 0.5 W/mK.

In another aspect, the invention provides a fixing roll comprising a roll shaft and a silicone rubber layer surrounding the outer periphery of the shaft; or a fixing roll comprising a roll shaft, a silicone rubber layer surrounding the outer periphery of the shaft, and a fluororesin or fluororubber layer surrounding the silicone rubber layer; or a fixing belt comprising a belt substrate, a silicone rubber layer disposed on the substrate, and a fluororesin or fluororubber layer disposed on the silicone rubber layer. In these embodiments, the silicone rubber layer is formed by curing the highly heat conductive silicone rubber composition defined above.

The highly heat conductive silicone rubber compositions of the invention for fixing rolls or belts cure into products having not only a high thermal conductivity, but also satisfactory heat resistance. Then fixing rolls or belts using the same are highly thermally conductive and remain durable during long-term service at elevated temperature.

DESCRIPTION OF THE PREFERRED EMBODIMENT

Component (A) of the heat conductive silicone composition according to the invention is a diorganopolysiloxane having at least two silicon atom-bonded alkenyl radicals in a molecule which is liquid at room temperature (25° C.). It is a base polymer of the composition. The alkenyl-containing organopolysiloxane used herein is preferably of the average compositional formula (1).

$$R^1_a SiO_{(4-a)/2} \qquad (1)$$

Herein $R^1$, which may be the same or different, is a substituted or unsubstituted monovalent hydrocarbon radical of 1 to 10 carbon atoms, preferably 1 to 8 carbon atoms, and "a" is a positive number in the range of 1.5 to 2.8, preferably 1.8 to 2.5.

Examples of the substituted or unsubstituted monovalent hydrocarbon radical attached to a silicon atom represented by $R^1$ include alkyl radicals such as methyl, ethyl, propyl, isopropyl, butyl, isobutyl, tert-butyl, pentyl, neopentyl, hexyl, cyclohexyl, octyl, nonyl, and decyl; aryl radicals such as phenyl, tolyl, xylyl and naphthyl; aralkyl radicals such as benzyl, phenylethyl and phenylpropyl; alkenyl radicals such as vinyl, allyl, propenyl, isopropenyl, butenyl, hexenyl, cyclohexenyl and octenyl; and substituted forms of the foregoing radicals in which some or all of the hydrogen atoms are substituted with halogen atoms (e.g., fluorine, bromine and chlorine), cyano radicals or the like, such as chloromethyl, chloropropyl, bromoethyl, trifluoropropyl and cyanoethyl. It is preferred that at least 90% of all $R^1$ radicals be methyl. At least two of $R^1$ radicals must be alkenyl radicals, preferably having 2 to 8 carbon atoms, more preferably 2 to 6 carbon atoms, most preferably vinyl.

It is preferred that the content of alkenyl radicals be $1.0\times10^{-6}$ to $5.0\times10^{-3}$ mol/g of the organopolysiloxane, especially $5.0\times10^{-6}$ to $1.0\times10^{-3}$ mol/g. An alkenyl content of less than $1.0\times10^{-6}$ mol/g may invite insufficient crosslinking, resulting in a gel-like material. An alkenyl content of more than $5.0\times10^{-3}$ mol/g may lead to too high a crosslinking density, with the resulting rubber becoming brittle.

The alkenyl radicals may be attached to the silicon atoms at the ends of the molecular chain or silicon atoms intermediate the molecular chain or both. The organopolysiloxane basically has a linear structure whose backbone consists of recurring diorganosiloxane units and is capped at both ends with triorganosiloxy radicals although it may have a partially branched structure or cyclic structure. With respect to the molecular weight or degree of polymerization, the organopolysiloxane should be liquid at room temperature (25° C.). Specifically, the organopolysiloxane should preferably have a viscosity of up to 200,000 mPa·s at 25° C., more preferably 100 to 100,000 mPa·s at 25° C.

Component (B) is an organohydrogenpolysiloxane containing at least two, preferably at least three hydrogen atoms bonded to silicon atoms (Si—H radicals) and having a viscosity of up to 1,000 mPa·s at 25° C., typically 0.1 to 1,000 mPa·s at 25° C., and preferably 0.5 to 500 mPa·s at 25° C. Component (B) serves as a curing or crosslinking agent for curing the composition in that Si—H radicals react with silicon atom-bonded alkenyl radicals in component (A) in a hydrosilylation addition reaction to induce crosslinking. The organohydrogenpolysiloxane (B) has the average compositional formula (2), and contains at least two, preferably at least three (usually 3 to 200), more preferably 3 to 100 silicon atom-bonded hydrogen atoms.

$$R^2_b H_c SiO_{(4-b-c)/2} \qquad (2)$$

Herein $R^2$ is independently a substituted or unsubstituted monovalent hydrocarbon radical having 1 to 10 carbon atoms, b is a positive number of 0.7 to 2.1, and c is a positive number of 0.001 to 1.0, and b+c is 0.8 to 3.0.

The monovalent hydrocarbon radicals represented by $R^2$ are as exemplified above for $R^1$, although such radicals free of aliphatic unsaturation are preferred. Preferably, b is a positive number of 0.8 to 2.0, and c is a positive number of 0.01 to 1.0, and b+c is 1.0 to 2.5. With respect to the molecular structure, the organohydrogenpolysiloxane may have a linear, cyclic, branched or three-dimensional network structure. The preferred organohydrogenpolysiloxane is liquid at room temperature (25° C.), with the number of silicon atoms per molecule (or degree of polymerization) being preferably 2 to about 300, and more preferably 4 to about 150. The silicon atom-bonded hydrogen atoms may be positioned either at ends or midway of the molecular chain or both.

Examples of the organohydrogenpolysiloxane include both end trimethylsiloxy-blocked methylhydrogenpolysiloxane, both end trimethylsiloxy-blocked dimethylsiloxanemethylhydrogen-siloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, copolymers of $(CH_3)_2HSiO_{1/2}$ units and $SiO_{4/2}$ units, and copolymers of $(CH_3)_2HSiO_{1/2}$ units, $SiO_{4/2}$ units and $(C_6H_5)SiO_{3/2}$ units.

An appropriate amount of the organohydrogen-polysiloxane (B) blended is 0.1 to 30 parts, preferably 0.3 to 20 parts by weight per 100 parts by weight of the organopolysiloxane (A). Outside the range, smaller amounts of component (B) result in gel-like materials due to under-cure, failing to provide rubbery elastomer products. Larger amounts of component (B) result in cured products having significantly reduced strength and increased compression set. For the same reason, the organohydrogen-polysiloxane (B) is preferably used in such amounts that the molar ratio of Si—H radicals in component (B) to silicon atom-bonded alkenyl radicals in component (A) may range from about 0.5 to 5 mol/mol, and more preferably from about 0.8 to 3 mol/mol.

The highly heat conductive powders (C) used herein include various fillers having heat conductivity. Examples include ground quartz, diatomaceous earth, aluminum oxide (alumina), aluminum hydroxide, zinc oxide, silicon carbide, magnesium oxide, aluminum nitride, and boron nitride. Of these, ground quartz, alumina, zinc oxide, magnesium oxide and silicon carbide are preferred.

The highly heat conductive powders are divided in terms of pH into three groups: (C-1) pH 8 or higher, (C-2) pH 6 to less than 8, and (C-3) pH below 6. The invention is characterized by the selection of two from these three groups.

When heavily loaded with an alkaline or acidic inorganic powder alone, siloxane polymers can be cleaved at agglomerates under hot condition, leading to substantial degradation. In contrast, combined use of powders having different pH values avoids such agglomeration and thus restrains degradation of siloxane polymers, leading to improved heat resistance.

As used herein, the pH of an inorganic powder refers to a measurement of a 30% by weight slurry thereof, for example, determined by mixing 30 g of an inorganic powder with 70 g of distilled water at 80° C. for 2 hours to form a slurry, cooling the slurry to room temperature (25° C.) and measuring the pH of the slurry.

The highly heat conductive powders used herein preferably have an average particle size in the range of 0.5 to 30 μm, especially 1 to 30 μm. A powder with an average particle size of less than 0.5 μm may be difficult to prepare or difficult to load in large amounts. An average particle size of more than 30 μm can detract from the mechanical strength of cured rubber and interfere with roll surface properties. The average particle size as used herein can be determined, for example, as the weight average (or median diameter) by a particle size distribution meter using analyzing means such as the laser light diffraction method.

As to the particle diameter, an average particle size of 0.5 to 30 μm is preferred as mentioned just above while it is more effective that two selected inorganic powders have different average particle sizes. Specifically, agglomeration of filler particles is effectively avoided when the ratio in average particle size of two inorganic powders, for example, the ratio of average particle size of powder (C-1) to average particle size of powder (C-2) (simply referred to as [(C-1)/(C-2)]), [(C-1)/(C-3)] or [(C-2)/(C-3)] is up to 0.5 or at least 2.

For the combination of two highly heat conductive powders, it is preferred to use alumina as the highly heat conductive powder (C-1) and ground quartz as the highly heat conductive powder (C-2). It is also preferred to use alumina commonly as the highly heat conductive powders (C-1) and (C-3).

The two highly heat conductive powders are mixed in a weight ratio between 1/9 and 9/1 and preferably between 2/8 and 8/2. Outside the range, the filler is composed essentially of an acidic or alkaline filler so that cured silicone rubber can be degraded under hot condition.

It is essential to use, in combination, two of the inorganic fillers (C-1), (C-2) and (C-3), that is, (C-1) and (C-2), (C-1) and (C-3), or (C-2) and (C-3). It is acceptable to use all three groups (C-1), (C-2) and (C-3) in combination. It is also acceptable to use an additional inorganic powder along with the combination of two groups, that is, (C-1) and (C-2), (C-1) and (C-3), or (C-2) and (C-3) or the combination of three groups (C-1), (C-2) and (C-3). In each of the groups (C-1), (C-2) and (C-3) and in the additional inorganic powder group, it is, of course, possible to use two or more different inorganic powders which belong to that group.

In the combination of all three groups (C-1), (C-2) and (C-3), it suffices that either one of combinations (C-1) and (C-2), (C-1) and (C-3), and (C-2) and (C-3) is a combination in a weight ratio between 1/9 and 9/1 although it is preferred-that all the combinations (C-1) and (C-2), (C-1) and (C-3), and (C-2) and (C-3) satisfy a weight ratio between 1/9 and 9/1. For the combination of two groups satisfying a weight ratio between 1/9 and 9/1, it is preferred that their average particle size ratio be up to 0.5 or at least 2. It is most preferred that all the combinations (C-1) and (C-2), (C-1) and (C-3), and (C-2) and (C-3) also satisfy an average particle size ratio of up to 0.5 or at least 2.

In the embodiment wherein an inorganic powder other than three groups (C-1), (C-2) and (C-3) is additionally used, either one of combinations (C-1) and (C-2), (C-1) and (C-3), and (C-2) and (C-3) may satisfy a weight ratio between 1/9 and 9/1 although it is preferred that the proportion of the additional inorganic powder is up to 1/10, more preferably up to 1/50, most preferably up to 1/100 of the total weight of inorganic powders (C-1), (C-2) and (C-3). It is preferred that the additional inorganic powder have an average particle size in the range of 0.01 to 30 μm, especially 0.05 to 10 μm.

The total amount of highly heat conductive inorganic powders (C) blended is 100 to 1,000 parts by weight, preferably 150 to 800 parts by weight per 100 parts by weight of component (A). Less than 100 pbw of inorganic powders fails to achieve a high thermal conductivity whereas more than 1,000 pbw is difficult to incorporate and substantially degrades roll rubber physical properties.

The highly heat conductive inorganic powders may be incorporated, for example, by mixing components (A) and (B) in a suitable mixer such as a planetary mixer or kneader, or by mixing at a high temperature of 100 to 200° C.

The inorganic powders may be surface treated with suitable agents such as silane coupling agents or partial hydrolyzates thereof, alkylalkoxysilanes or partial hydrolyzates thereof, organosilazanes, titanate coupling agents, organopolysiloxane oil, and hydrolyzable functional group-containing organopolysiloxanes. Such surface treatment may be done on the inorganic powders themselves prior to use, or during mixing with oil. By the surface treatment, it becomes possible to prevent a composition from a rapid rise of viscosity even when highly heat conductive inorganic powders are loaded in large amounts, and to prevent a cured composition from increasing compression set.

The addition reaction catalyst as component (D) is typically selected from among platinum catalysts such as platinum black, platinic chloride, chloroplatinic acid, reaction products of chloroplatinic acid with monohydric alcohols, complexes of chloroplatinic acid with olefins, and platinum bisacetoacetate, palladium catalysts and rhodium catalysts. The addition reaction catalyst is used in a catalytic amount, usually in an amount to give about 0.5 to 1,000 ppm, desirably about 1 to 500 ppm of platinum group metal based on the weight of components (A) and (B) combined.

In the silicone rubber composition of the invention, there may be further admixed reinforcing silica fillers such as precipitated silica and fumed silica, fillers such as clay, calcium carbonate, diatomaceous earth and titanium dioxide, heat resistance improvers such as iron oxide, cerium oxide and iron octylate, various carbon functional silanes for improving adhesion or moldability, nitrogen compounds and halogen compounds for imparting flame retardance, insofar as they do not compromise the objects of the invention.

Methods of shaping the silicone rubber composition of the invention include casting, compression molding, injection molding, and coating. Appropriate curing conditions include a temperature of 100 to 300° C. and a time of 10 seconds to 1 hour. For the purposes of lowering compression set and reducing low molecular weight siloxane fractions, the shaping step may be followed by post-curing or secondary curing in an oven at 120 to 250° C. for 30 minutes to 70 hours.

A cured layer of the highly heat conductive silicone rubber composition preferably has a thermal conductivity of at least 0.5 W/mK, more preferably 0.6 to 2 W/mK. Too low a thermal conductivity may fail to provide satisfactory high-speed printer performance.

According to the invention, a fixing roll or belt is arrived at by forming a highly heat conductive cured layer of the inventive silicone rubber composition on a metal shaft of stainless steel, iron, nickel or aluminum or a belt substrate of heat resistant resin, typically polyimide. The material and size of the metal shaft or belt substrate may be suitably selected in accordance with the type of a desired roll or belt. Also, the method of shaping and curing the silicone rubber composition may be appropriately selected. For example, the composition may be shaped by any of casting, transfer molding, injection molding and coating methods and cured by heating. A fluororesin layer or fluororubber layer may be formed on the outer surface of the silicone rubber layer. In this embodiment, the fluororesin layer is formed of a fluororesin coating material or fluororesin tubing so that it encloses or covers the silicone rubber layer. The fluororesin coating materials include, for example, polytetrafluoroethylene resin (PTFE) latexes, and DAI-EL latexes (fluorochemical latexes by Daikin Industries, Ltd.). The fluororesin tubing is commercially available, and examples include polytetrafluoroethylene resins (PTFE), tetrafluoroethyleneperfluoroalkyl vinyl ether copolymer resins (PFA), fluorinated ethylene-propylene copolymer resins (FEP), polyvinylidene fluoride resins (PVDF), and polyvinyl fluoride resins.

The thickness of the silicone rubber layer may be properly selected although a thickness of 0.05 to 80 mm, especially 0.1 to 50 mm is preferred to make effective use of the elasticity of silicone rubber. The overlying fluororesin or fluororubber layer should preferably have a thickness of 5 to 200 μm, more preferably 10 to 100 μm.

EXAMPLE

Examples of the invention are given below by way of illustration and not by way of limitation. All parts are by weight, and pH is a measurement of a 30 wt % slurry.

Example 1

A planetary mixer was charged with 100 parts of a dimethylpolysiloxane capped with dimethylvinylsiloxy radicals at both ends (degree of polymerization 500), 2 parts of hydrophobized fumed silica having a specific surface area of 110 m²/g (R-972 by Nippon Aerosil Co., Ltd.), 130 parts of alumina having an average particle size of 2.5 μm and pH 9.1, and 120 parts of ground quartz having an average particle size of 12 μm and pH 7.2, which were agitated at room temperature (23° C.) for two hours. The mixture was milled on a three roll mill for dispersing the fillers, after which it was fed back to the planetary mixer. To the mixture were added 1.0 part of methylhydrogenpolysiloxane having Si—H radicals at both ends and side chains (degree of polymerization 17, Si—H content 0.0060 mol/g), 0.05 part of ethynyl cyclohexanol as a reaction regulator, and 0.1 part of a platinum catalyst (Pt concentration 1%). Agitation was continued for 15 minutes to finish a silicone rubber composition (EX1).

This silicone rubber composition (EX1) was press cured at 120° C. for 10 minutes and oven cured at 200° C. for 4 hours. The cured sample was measured for hardness according to JIS K6301 and for thermal conductivity by means of a quick thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Example 2

A planetary mixer was charged with 80 parts of a dimethylpolysiloxane capped with trimethylsiloxy radicals at both ends and having vinyl radicals on side chains (vinyl content 0.000072 mol/g, degree of polymerization 300), 20 parts of a dimethylpolysiloxane capped with dimethylvinylsiloxy radicals at both ends (degree of polymerization 500), 2 parts of hydrophobized fumed silica having a specific surface area of 110 m²/g (R-972 by Nippon Aerosil Co., Ltd.), 5 parts of ethyltrimethoxysilane, 150 parts of alumina having an average particle size of 2.5 μm and pH 9.1, and 180 parts of alumina having an average particle size of 15 μm and pH 5.6, which were agitated at 150° C. for two hours. The mixture was milled on a three roll mill for dispersing the fillers, after which it was fed back to the planetary mixer. To the mixture were added 2.8 parts of methylhydrogenpolysiloxane having Si—H radicals at both ends and side chains (degree of polymerization 15, Si—H content 0.0035 mol/g), 1.2 parts of dimethylpolysiloxane capped with trimethylsiloxy radicals at both ends and having vinyl radicals on side chains (vinyl content 0.018 mol/g, degree of polymerization 20), and 0.1 part of a platinum catalyst (Pt concentration 1%). Agitation was continued for 15 minutes to finish a silicone rubber composition (EX2).

This silicone rubber composition (EX2) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Example 3

A planetary mixer was charged with 50 parts of a dimethylpolysiloxane capped with dimethylvinylsiloxy radicals at both ends (degree of polymerization 200), 50 parts of a dimethylpolysiloxane capped with dimethylvinylsiloxy radicals at both ends (degree of polymerization 500), 8 parts of a siloxane compound of the following general formula (I):

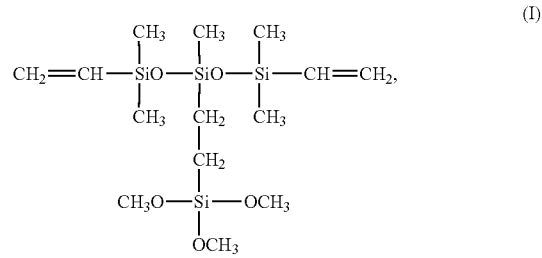

5 parts of phenyltrimethoxysilane, 100 parts of magnesium oxide having an average particle size of 4 μm and pH 8.8, and 100 parts of zinc oxide having an average particle size of 12 μm and pH 6.9, which were agitated at room temperature (23° C.) for two hours. The mixture was milled on a three roll mill for dispersing the fillers, after which it was fed back to the planetary mixer. To the mixture were added 1.5 parts of methylhydrogenpolysiloxane having Si—H radicals at both ends and side chains (degree of polymerization 17, Si—H content 0.0060 mol/g), 0.05 part of ethynyl cyclohexanol as a reaction regulator, 0.1 part of tetravinyltetramethylcyclotetrasiloxane, and 0.15 part of a platinum catalyst (Pt concentration 1%). Agitation was continued for 15 minutes to finish a silicone rubber composition (EX3).

This silicone rubber composition (EX3) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Example 4

A planetary mixer was charged with 100 parts of a dimethylpolysiloxane capped with trimethylsiloxy radicals at both ends and having vinyl radicals on side chains (vinyl content 0.000072 mol/g, degree of polymerization 300), 2 parts of hydrophobized fumed silica having a specific surface area of 110 $m^2/g$ (R-972 by Nippon Aerosil Co., Ltd.), 3 parts of methyltrimethoxysilane, 1 part of vinyltrimethoxysilane, 200 parts of alumina having an average particle size of 15 μm and pH 5.6, and 50 parts of ground quartz having an average particle size of 4 μm and pH 7.5, which were agitated at 150° C. for two hours. The mixture was milled on a three roll mill for dispersing the fillers, after which it was fed back to the planetary mixer. To the mixture were added 2.9 parts of methylhydrogenpolysiloxane having Si—H radicals at both ends and side chains (degree of polymerization 15, Si—H content 0.0035 mol/g), 0.05 part of ethynyl cyclohexanol as a reaction regulator, and 0.1 part of a platinum catalyst (Pt concentration 1%). Agitation was continued for 15 minutes to finish a silicone rubber composition (EX4).

This silicone rubber composition (EX4) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Example 5

A planetary mixer was charged with 100 parts of a dimethylpolysiloxane capped with dimethylvinylsiloxy radicals at both ends (degree of polymerization 500), 2 parts of hydrophobized fumed silica having a specific surface area of 110 $m^2/g$ (R-972 by Nippon Aerosil Co., Ltd.), 80 parts of alumina having an average particle size of 2.5 μm and pH 9.1, 80 parts of zinc oxide having an average particle size of 12 μm and pH 6.9, and 80 parts of magnesium oxide having an average particle size of 4 μm and pH 8.8, which were agitated at room temperature (23° C.) for two hours. The mixture was milled on a three roll mill for dispersing the fillers, after which it was fed back to the planetary mixer. To the mixture were added 1.0 part of methylhydrogenpolysiloxane having Si—H radicals at both ends and side chains (degree of polymerization 1.7, Si—H content 0.0060 mol/g), 0.05 part of ethynyl cyclohexanol as a reaction regulator, and 0.1 part of a platinum catalyst (Pt concentration 1%). Agitation was continued for 15 minutes to finish a silicone rubber composition (EX5).

This silicone rubber composition (EX5) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Comparative Example 1

A planetary mixer was charged with 100 parts of a dimethylpolysiloxane capped with dimethylvinylsiloxy radicals at both ends (degree of polymerization 500), 2 parts of hydrophobized fumed silica having a specific surface area of 110 $m^2/g$ (R-972 by Nippon Aerosil Co., Ltd.), and 250 parts of alumina having an average particle size of 2.5 μm and pH 9.1, which were agitated at room temperature (23° C.) for two hours. The mixture was milled on a three roll mill for dispersing the fillers, after which it was fed back to the planetary mixer. To the mixture were added 1.0 part of methylhydrogenpolysiloxane having Si—H radicals at both ends and side chains (degree of polymerization 17, Si—H content 0.0060 mol/g), 0.05 part of ethynyl cyclohexanol as a reaction regulator, and 0.1 part of a platinum catalyst (Pt concentration 1%). Agitation was continued for 15 minutes to finish a silicone rubber composition (CE1).

This silicone rubber composition (CE1) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Comparative Example 2

A planetary mixer was charged with 80 parts of a dimethylpolysiloxane capped with trimethylsiloxy radicals at both ends and having vinyl radicals on side chains (vinyl content 0.000072 mol/g, degree of polymerization 300), 20 parts of a dimethylpolysiloxane capped with dimethylvinylsiloxy radicals at both ends (degree of polymerization of 500), 2 parts of hydrophobized fumed silica having a specific surface area of 110 $m^2/g$ (R-972 by Nippon Aerosil Co., Ltd.), 5 parts of ethyltrimethoxysilane, and 330 parts of alumina having an average particle size of 15 μm and pH 5.6, which were agitated at 150° C. for two hours. The mixture was milled on a three roll mill for dispersing the fillers, after which it was fed back to the planetary mixer. To the mixture were added 2.8 parts of methylhydrogenpolysiloxane having Si—H radicals at both ends and side chains (degree of polymerization 15, Si—H content 0.0035 mol/g), 1.2 parts of a dimethylpolysiloxane capped with trimethylsiloxy radicals at both ends and having vinyl radicals on side chains (vinyl content 0.018 mol/g, degree of polymerization 20), and 0.1 part of a platinum catalyst (Pt concentration 1%). Agitation was continued for 15 minutes to finish a silicone rubber composition (CE2).

This silicone rubber composition (CE2) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Comparative Example 3

A planetary mixer was charged with 50 parts of a dimethylpolysiloxane capped with dimethylvinylsiloxy radicals at both ends (degree of polymerization 200), 50 parts of a dimethylpolysiloxane capped with dimethylvinylsiloxy radicals at both ends (degree of polymerization 500), 8 parts of a siloxane compound of the following general formula (I):

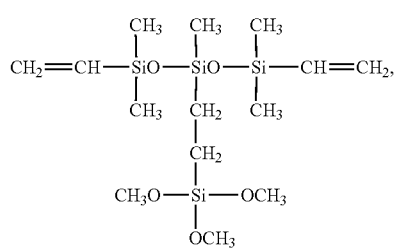

5 parts of phenyltrimethoxysilane, and 200 parts of magnesium oxide having an average particle size of 4 μm and pH 8.8, which were agitated at room temperature (23° C.) for two hours. The mixture was milled on a three roll mill for dispersing the fillers, after which it was fed back to the planetary mixer. To the mixture were added 1.5 parts of methylhydrogenpolysiloxane having Si—H radicals at both ends and side chains (degree of polymerization 17, Si—H content 0.0060 mol/g), 0.05 part of ethynyl cyclohexanol as a reaction regulator, 0.1 part of tetravinyltetramethylcyclotetrasiloxane, and 0.15 part of a platinum catalyst (Pt concentration 1%). Agitation was continued for 15 minutes to finish a silicone rubber composition (CE3).

This silicone rubber composition (CE3) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

Comparative Example 4

A planetary mixer was charged with 100 parts of a dimethylpolysiloxane capped with trimethylsiloxy radicals at both ends and having vinyl radicals on side chains (vinyl content 0.000072 mol/g, degree of polymerization 300), 2 parts of hydrophobized fumed silica having a specific surface area of 110 m²/g (R-972 by Nippon Aerosil Co., Ltd.), 3 parts of methyltrimethoxysilane, 1 part of vinyltrimethoxysilane, and 250 parts of alumina having an average particle size of 15 μm and pH 5.6, which were agitated at 150° C. for two hours. The mixture was milled on a three roll mill for dispersing the fillers, after which it was fed back to the planetary mixer. To the mixture were added 2.9 parts of methylhydrogenpolysiloxane having Si—H radicals at both ends and side chains (degree of polymerization 15, Si—H content 0.0035 mol/g), 0.05 part of ethynyl cyclohexanol as a reaction regulator, and 0.1 part of a platinum catalyst (Pt concentration 1%). Agitation was continued for 15 minutes to finish a silicone rubber composition (CE4).

This silicone rubber composition (CE4) was press cured at 120° C. for 10 minutes and oven cured at 200° C. for 4 hours. The cured sample was measured for hardness according to JIS K6301 and for thermal conductivity by means of a thermal conductivity meter QTM-3 (Kyoto Electronic Co., Ltd.).

The sample was allowed to stand in an oven at 230° C. for 200 hours, after which its hardness was measured again to see whether or not it was thermally degraded. The results are shown in Table 1.

TABLE 1

| | Hardness (Durometer A) | Hardness (Durometer A) after 230° C. × 200 hr | Thermal conductivity (W/mK) |
|---|---|---|---|
| Example 1 | 35 | 38 | 0.68 |
| Example 2 | 26 | 28 | 0.81 |
| Example 3 | 32 | 35 | 0.59 |
| Example 4 | 45 | 48 | 0.62 |
| Example 5 | 33 | 36 | 0.66 |
| Comparative Example 1 | 30 | 41 | 0.65 |
| Comparative Example 2 | 24 | 39 | 0.79 |
| Comparative Example 3 | 35 | 46 | 0.62 |
| Comparative Example 4 | 42 | 51 | 0.65 |

Example 6

Onto the surface of an aluminum shaft having a diameter of 10 mm and a length of 300 mm, Primer No. 101A/B for addition reaction type liquid silicone rubber (Shin-Etsu Chemical Co., Ltd.) was applied. The primed aluminum shaft was fixedly set in a mold, which was filled with silicone rubber composition (EX1) of Example 1 under a pressure of 10 kgf/cm². The composition was heat cured at 150° C. for 30 minutes and post-cured at 200° C. for 4 hours, completing a silicone rubber-made fixing roll.

This fixing roll was mounted in an electrophotographic copier which was continuously operated to produce 100,000 A4-size plain paper copies. Neither paper wrinkles or clogging took place. All the images copied were clear.

Comparative Example 5

A fixing roll was prepared as in Example 6 except that silicone rubber composition (CE1) was used instead of silicone rubber composition (EX1). This fixing roll was mounted in an electrophotographic copier which was continuously operated to produce A4-size plain paper copies. The image became vague after 50,000 copies.

Example 7

Onto the surface of an aluminum shaft having a diameter of 10 mm and a length of 300 mm, Primer No. 101A/B for addition reaction type liquid silicone rubber (Shin-Etsu Chemical Co., Ltd.) was applied. The primed aluminum shaft was inserted into a fluororesin PFA tube of 50 μm gage whose inner surface had been primed. Silicone rubber composition (EX2) of Example 2 was fed between the tube and the shaft under a pressure of 5 kgf/cm². The composition was heat cured at 150° C. for 30 minutes and post-cured at 200° C. for 4 hours, completing a PFA resin-covered, silicone rubber-made fixing roll having an outer diameter of 20 mm and a length of 250 mm.

This fixing roll was mounted in an electrophotographic copier which was continuously operated to produce 100,000 A4-size plain paper copies. Neither paper wrinkles or clogging took place. All the images copied were clear.

Comparative Example 6

A fixing roll was prepared as in Example 7 except that silicone rubber composition (CE2) was used instead of silicone rubber composition (EX2). This fixing roll was mounted in an electrophotographic copier which was continuously operated to produce A4-size plain paper copies. The image became vague after 70,000 copies.

Example 8

Onto the outer peripheral surface of a belt substrate of nickel (gage 50 μm, inner diameter 55 mm, width 250 mm), Primer No. 101A/B for addition reaction type liquid silicone rubber (Shin-Etsu Chemical Co., Ltd.) was applied, dried and baked at 150° C. for 15 minutes. Onto the primed surface, silicone rubber composition (EX3) of Example 3 was coated to a thickness of about 300 μm, heat cured at 150° C. for 15 minutes and post-cured at 200° C. for 2 hours. Onto the surface of the cured silicone rubber, primer GLP-103SR for DAI-EL latex and silicone rubber (Daikin Industries, Ltd.) was evenly coated and heated at 80° C. for 10 minutes. Then DAI-EL latex GLS-213 (Daikin Industries, Ltd.) was evenly sprayed and baked at 300° C. for one hour, completing a fluororesin-coated silicone rubber-made fixing belt.

This fixing belt was mounted in an electrophotographic copier which was continuously operated to produce 50,000 A4-size plain paper copies. Neither paper wrinkles or clogging took place. All the images copied were clear.

Comparative Example 7

A fixing belt was prepared as in Example 8 except that silicone rubber composition (CE3) was used instead of silicone rubber composition (EX3). This fixing belt was mounted in an electrophotographic copier which was continuously operated to produce A4-size plain paper copies. The image became vague after 5,000 copies. Paper wrinkled at 12,000th copy. The experimental run was interrupted at this point.

Although some preferred embodiments have been described, many modifications and variations may be made thereto in light of the above teachings. It is therefore to be understood that the invention may be practiced otherwise than as specifically described without departing from the scope of the appended claims.

Japanese Patent Application No. 2003-299799 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A highly heat conductive silicone rubber composition for fixing rolls or belts, comprising
   (A) 100 parts by weight of an organopolysiloxane having at least two silicon atom-bonded alkenyl radicals in a molecule which is liquid at room temperature,
   (B) 0.1 to 30 parts by weight of a liquid organohydrogenpolysiloxane having at least two silicon atom-bonded hydrogen atoms in a molecule which has a viscosity of up to 1,000 mPa·s at 25° C.,
   (C) 100 to 1,000 parts by weight of a highly heat conductive inorganic powder comprising a blend of two inorganic powders selected from (C-1) and (C-2), a combination of (C-2) and (C-3), and a combination of magnesium oxide in (C-1) and alumina in (C-3) in a weight ratio between 1/9 and 9/1,
   (C-1) a highly heat conductive inorganic powder selected from the group consisting of alumina and magnesium oxide which forms a 30% slurry having a pH value of at least 8,
   (C-2) a highly heat conductive inorganic powder selected from the group consisting of group quartz and zinc oxide which forms a 30% slurry having a pH value of 6 to less than 8, and
   (C-3) a highly heat conductive inorganic powder consisting of alumina which forms a 30% slurry having a pH value of less than 6, and
   (D) a catalytic amount of an addition reaction catalyst.

2. The highly heat conductive silicone rubber composition of claim 1, wherein the highly heat conductive powder (C) has an average particle size in the range of 0.5 to 30 μm, and the ratio in average particle size of two inorganic powders, [(C-1)/(C-2)], [(C-1)/(C-3)] or [(C-2)/(C-3)] is up to 0.5 or at least 2.

3. The highly heat conductive silicone rubber composition of claim 1, which in the cured state has a thermal conductivity of at least 0.5 W/mK.

4. A fixing roll comprising a roll shaft and a silicone rubber layer surrounding the outer periphery of the shaft, the silicone rubber layer being formed by curing a highly heat conductive silicone rubber composition comprising
   (A) 100 parts by weight of an organopolysiloxane having at least two silicon atom-bonded alkenyl radicals in a molecule which is liquid at room temperature,
   (B) 0.1 to 30 parts by weight of a liquid organohydrogenpolysiloxane having at least two silicon atom-bonded hydrogen atoms in a molecule which has a viscosity of up to 1,000 mPa·s at 25° C.,
   (C) 100 to 1,000 parts by weight of a highly heat conductive inorganic powder comprising a blend of two inorganic powders selected from (C-1) to (C-3) in a weight ratio between 1/9 and 9/1,
   (C-1) a highly heat conductive inorganic powder which forms a 30% slurry having a pH value of at least 8,
   (C-2) a highly heat conductive inorganic powder which forms a 30% slurry having a pH value of 6 to less than 8, and (C-3) a highly heat conductive inorganic powder which forms a 30% slurry having a pH value of less than 6, and (D) a catalytic amount of an addition reaction catalyst.

5. The highly heat conductive silicone rubber composition of claim 4, wherein the highly heat conductive powder (C) has an average particle size in the range of 0.5 to 30 μm, and the ratio in average particle size of two inorganic powders, [(C-1)/(C-2)], [(C-1)/(C-3)] or [(C-2)/(C-3)] is up to 0.5 or at least 2.

6. The highly heat conductive silicone rubber composition of claim 4, which in the cured state has a thermal conductivity of at least 0.5 W/mK.

7. A fixing roll comprising a roll shaft, a silicone rubber layer surrounding the outer periphery of the shaft, and a fluororesin or fluororubber layer surrounding the silicone rubber layer, the silicone rubber layer being formed by curing the highly heat conductive silicone rubber composition comprising (A) 100 parts by weight of an organopolysiloxane having at least two silicon atom-bonded alkenyl radicals in a molecule which is liquid at room temperature, (B) 0.1 to 30 parts by weight of a liquid organohydrogenpolysiloxane having at least two silicon atom-bonded hydrogen atoms in a molecule which has a viscosity of up to 1,000 mPa·s at 25° C, (C) 100 to 1,000 parts by weight of a highly heat conductive inorganic powder comprising a blend of two inorganic powders selected from (C-1) to (C-3) in a weight ratio between 1/9 and 9/1, (C-1) a highly heat conductive inorganic powder which forms a 30% slurry having a pH value of at least 8, (C-2) a highly heat conductive inorganic powder which forms a 30% slurry having a pH value of 6 to less than 8, and (C-3) a highly heat conductive inorganic powder which forms a 30% slurry having a pH value of less than 6, and (D) a catalytic amount of an addition reaction catalyst.

8. The highly heat conductive silicone rubber composition of claim 7, wherein the highly heat conductive powder (C) has an average particle size in the range of 0.5 to 30 μm, and the ratio in average particle size of two inorganic powders, [(C-1)/(C-2)], [(C-1)/(C-3)] or [(C-2)/(C-3)] is up to 0.5 or at least 2.

9. The highly heat conductive silicone rubber composition of claim 7, which in the cured state has a thermal conductivity of at least 0.5 W/mK.

10. A fixing belt comprising a belt substrate, a silicone rubber layer disposed on the substrate, and a fluororesin or fluororubber layer disposed on the silicone rubber layer, the silicone rubber layer being formed by curing the highly heat conductive silicone rubber composition comprising (A) 100 parts by weight of an organopolysiloxane having at least two silicon atom-bonded alkenyl radicals in a molecule which is liquid at room temperature, (B) 0.1 to 30 parts by weight of a liquid organohydrogenpolysiloxane having at least two silicon atom-bonded hydrogen atoms in a molecule which has a viscosity of up to 1,000 mPa·s at 25° C, (C) 100 to 1,000 parts by weight of a highly heat conductive inorganic powder comprising a blend of two inorganic powders selected from (C-1) to (C-3) in a weight ratio between 1/9 and 9/1, (C-1) a highly heat conductive inorganic powder which forms a 30% slurry having a pH value of at least 8, (C-2) a highly heat conductive inorganic powder which forms a 30% slurry having a pH value of 6 to less than 8, and (C-3) a highly heat conductive inorganic powder which forms a 30% slurry having a pH value of less than 6, and (D) a catalytic amount of an addition reaction catalyst.

11. The highly heat conductive silicone rubber composition of claim 10, wherein the highly heat conductive powder (C) has an average particle size in the range of 0.5 to 30 μm, and the ratio in average particle size of two inorganic powders, [(C-1)/(C-2)], [(C-1)/(C-3)] or [(C-2)/(C-3)] is up to 0.5 or at least 2.

12. The highly heat conductive silicone rubber composition of claim 10, which in the cured state has a thermal conductivity of at least 0.5 W/mK.

13. A highly heat conductive silicone rubber composition for fixing rolls or belts, comprising (A) 100 parts by weight of an organopolysiloxane having at least two silicon atom-bonded alkenyl radicals in a molecule which is liquid at room temperature, (B) 0.1 to 30 parts by weight of a liquid organohydrogenpolysiloxane having at least two silicon atom-bonded hydrogen atoms in a molecule which has a viscosity of up to 1,000 mPa·s at 25° C, (C) 100 to 1,000 parts by weight of a highly heat conductive inorganic powder comprising a blend of two inorganic powders selected from a combination of (C-1) and (C-3) in a weight ratio between 1/9 and 9/1, (C-1) a highly heat conductive inorganic powder consisting of alumina which forms a 30% slurry having a pH value of at least 8, and (C-3) a highly heat conductive inorganic powder consisting of alumina which forms a 30% slurry having a pH value of less than 6, and (D) a catalytic amount of an addition reaction catalyst.

14. The highly heat conductive silicone rubber composition of claim 13, wherein the highly heat conductive powder (C) has an average particle size in the range of 0.5 to 30 μm, and the ratio in average particle size of two inorganic powders, [(C-1)/(C-2)], [(C-1)/(C-3)] or [(C-2)/(C-3)] is up to 0.5 or at least 2.

15. The highly heat conductive silicone rubber composition of claim 13, which in the cured state has a thermal conductivity of at least 0.5 W/mK.

* * * * *